July 31, 1962    J. D. COLLINS    3,046,806
DRIVE CHAIN
Filed Feb. 29, 1960
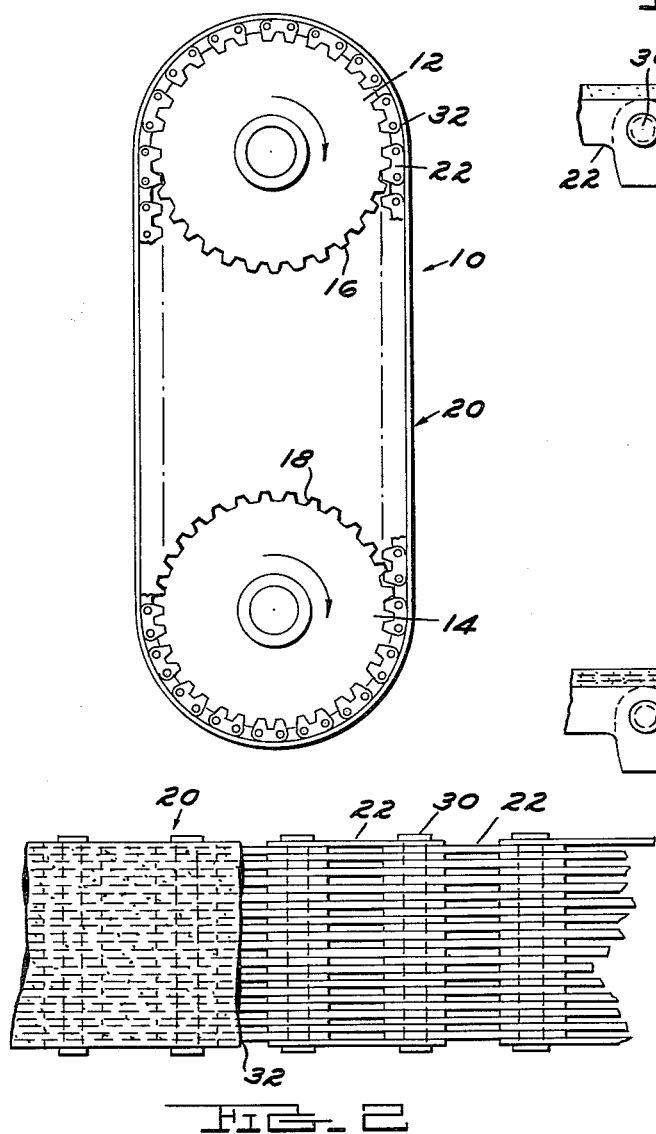
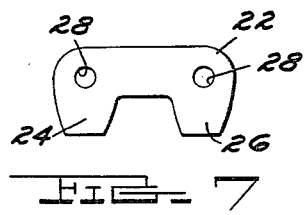
JACK D. COLLINS
INVENTOR.
BY John R. Faulkner
Clifford L. Sadler
ATTORNEYS United States Patent Office 3,046,806
Patented July 31, 1962

3,046,806
DRIVE CHAIN
Jack D. Collins, Dearborn, Mich., assignor to Ford Motor Company, Dearborn, Mich., a corporation of Delaware
Filed Feb. 29, 1960, Ser. No. 11,794
4 Claims. (Cl. 74—245)

The present application relates to chains and more particularly to a link type drive chain capable of transmitting power from one rotating member to another.

The drive chains of the link type are commonly used for driving the timing mechanism of an automotive internal combustion engine or in a transfer drive to transmit power from the axis of rotation of a driving member such as an engine output to the axis of a driven member which may be a vehicle's driveshaft.

While power chains may be constructed in a variety of ways, one of the more common type is fabricated from a series of short flat metal links which are pinned together at their ends to make a continuous flexible chain. Each of the links are usually stamped from sheet metal.

While a chain of this construction is particularly efficient when transferring power from one sprocket to another it has the unfortunate fault that it is usually quite noisy in operation. Due to the clearance between the links provided to permit the chain to be highly flexible the individual links rub against each other and vibrate to create objectionable noise.

Noise resulting from a chain drive within an automobile is particularly undesirable from a commercial standpoint. Therefore, it is the principle object of the present invention to provide an improvement in link-type drive chains which will reduce noise and vibration usually associated with their operation.

In accordance with the present invention, a drive chain such as one of the link type is provided with a continuous band of rubber or rubber-like dampening material bonded to its periphery.

These and further objects of the present invention will become more apparent from the following description and accompanying drawings, in which:

FIGURE 1 is an elevational view of a chain type transfer drive;

FIGURE 2 is a plan view, partly cut away, showing the construction of the chain of FIGURE 1;

FIGURE 3 is an enlarged elevational view of the chain of FIGURE 1;

FIGURE 4 is a sectional view taken along section lines 4—4 of FIGURE 3;

FIGURE 5 corresponds to FIGURE 3 and shows a modification of the present invention;

FIGURE 6 is a sectional view taken along section lines 6—6 of FIGURE 5;

FIGURE 7 is a side elevational view of one of the links making up the chain, and FIGURE 8 is a top plan view of the link of FIGURE 7.

Referring now to the drawings for a more detailed description of the present invention, wherein like reference numerals identify like parts throughout the various views, there is disclosed in FIGURE 1 a chain type transfer drive 10.

The transfer drive 10 is comprised of a driving sprocket wheel and a driven sprocket wheel which are identified by the numerals 12 and 14. Each of the wheels 12 and 14 are provided with a continuous series of radially extending circumferentially spaced teeth 16 and 18 of similar profile configuration.

Encircling the pair of wheels 12 and 14 and engaging the teeth 16, 18 is a drive chain 20. The chain 20 is fabricated in part from a plurality of links 22. The links 22 are flat elongated sheet metal pieces having a pair of depending teeth 24 and 26 and a pair of left and right holes 28.

The chain 20 is manufactured by assembling the links 22 in a staggered fashion on pivot pins 30 which pass through the holes 28. Each of the links 22 are assembled on the pins 30 with an alternate arrangement, that is, the first link 22 will extend from the pin 30 to the right-hand side and the second link 22 will engage the pin 30 so as to extend to the left-hand side. With this assembled arrangement a metallic web or chain is fabricated.

When the links 22 are stamped, the teeth 24 and 26 are formed to a size so as to complement the spacing between the teeth 16 and 18.

After the link portion of the drive chain 20 is assembled with sufficient links serially arranged so as to provide the appropriate circumferential length, a continuous layer or band of rubber or rubber-like material 32 is applied about the peripheral surface of the chain links. The layer 32 is formed of a soft material so as to be highly flexible, easily moldable to the chain, and have the appropriate qualities to dampen or deaden noise and vibration associated with the conventional chain link.

The combination of the pinned together links 22 and their engagement with the teeth 16 and 18 constitute the driving component of the chain 20. The rubber layer 32 serves as a noise and vibration dampener only and not a load transferring member.

FIGURES 5 and 6 disclose a modification of this invention. In this alternate arrangement the chain link portion of the drive 20 is identical to that previously discussed. However, the noise dampening exterior layer is comprised of the combination of rubber and steel strands for reinforcement. The rubber 34 extends for the full width of the chain 20 and completely encircles the exterior surface as previously described. A plurality of reinforcing steel strands or cables 36 are embedded within the body of the rubber 34. The steel strands 36 provide reinforcement for the rubber 34, and add additional strength to the entire assembly. It also assists in holding the rubber layer 34 against the links 22 to which it is bonded.

The present invention provides a sound absorbing and dampening layer for a chain drive which is adaptable to nearly all of the normal applications of a link chain. It has been cited herein as being used in association with an automotive engine merely as an example of a possible application. In addition, it is not intended that the invention be limited to chains of the particular type illustrated. It is also adaptable to other constructions of articulated chains.

The foregoing description constitutes the preferred embodiment of the present invention, however, further modifications and uses may occur to those skilled in the art which will come within the scope and spirit of the appended claims.

What is claimed is:

1. A device for transmitting power having an articulated chain comprising closely spaced pinned-together flat parallel links, a sound absorbing flat thin band of flexible elastomeric material secured to the exterior periphery of said chain in contact with said links, said band having a width approximately equal to that of said chain, and reinforcing strands embedded in said band.

2. A device for transmitting power between power input and power output sprockets comprising an articulated chain having a plurality of closely spaced flat parallel links, pin means interconnecting said links, said links lying in planes perpendicular to the axis of rotation of said sprockets, a sound absorbing and dampening layer encircling said chain and in contact with the outer edge of each of said links, said layer being formed as a flat continuous thin band of flexible elastomeric material having a width approximately equal to said chain, and reinforcing means embedded in said band.

3. A device for transmitting power having an articulated chain comprising closely spaced pinned-together flat parallel links, a sound absorbing flat thin band of flexible elastomeric material secured to the exterior periphery of said chain in contact with said links, said band having a width approximately equal to that of said chain.

4. A device for transmitting power between power input and power output sprockets comprising an articulated chain having a plurality of closely spaced flat parallel links, pin means interconnecting said links, said links lying in planes perpendicular to the axis of rotation of said sprockets, a sound absorbing and dampening layer encircling said chain and in contact with the outer edge of each of said links, said layer being formed as a flat continuous thin band of flexible elastomeric material having a width approximately equal to said chain.

References Cited in the file of this patent

UNITED STATES PATENTS

| | | |
|---|---|---|
| 1,101,209 | Pitt | June 23, 1914 |
| 1,580,910 | Layman et al. | Apr. 13, 1926 |
| 2,275,048 | Hohnecker | Mar. 3, 1942 |
| 2,869,932 | Eichweber | Jan. 20, 1959 |
| 2,879,881 | Tilton | Mar. 31, 1959 |
| 2,917,347 | Reuter et al. | Dec. 15, 1959 |
| 2,969,258 | Murray | Jan. 24, 1961 |

FOREIGN PATENTS

| | | |
|---|---|---|
| 39,300 | France | July 28, 1931 |
| 1,063,512 | France | Dec. 16, 1953 |